(12) United States Patent
Stewart

(10) Patent No.: US 6,881,489 B2
(45) Date of Patent: Apr. 19, 2005

(54) THIN SHEET MIRROR AND $Nd_2O_3$ DOPED GLASS

(75) Inventor: Ronald L. Stewart, Elmira, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/016,840

(22) Filed: Dec. 13, 2001

(65) Prior Publication Data

US 2002/0155301 A1 Oct. 24, 2002

Related U.S. Application Data

(60) Provisional application No. 60/255,759, filed on Dec. 15, 2000.

(51) Int. Cl.$^7$ .................. B32B 17/06; C03C 3/095; G02B 5/26
(52) U.S. Cl. .................. 428/433; 428/432; 428/434; 501/64; 359/884
(58) Field of Search .................. 359/838, 850, 359/884; 428/432, 426, 433, 434; 501/64

(56) References Cited

U.S. PATENT DOCUMENTS

| | | | | |
|---|---|---|---|---|
| 4,315,186 A | * | 2/1982 | Hirano et al. | 313/111 |
| 5,039,631 A | | 8/1991 | Krashkevich et al. | 501/64 |
| 5,076,674 A | | 12/1991 | Lynam | 359/274 |
| 5,077,240 A | | 12/1991 | Hayden et al. | 501/67 |
| 5,446,007 A | | 8/1995 | Krashkevich et al. | 501/64 |
| 5,548,491 A | * | 8/1996 | Karpen | 362/510 |
| 5,566,031 A | | 10/1996 | Meyr et al. | 359/883 |
| 5,844,721 A | | 12/1998 | Karpen et al. | 359/603 |
| 6,180,218 B1 | | 1/2001 | Fyles et al. | 428/220 |

FOREIGN PATENT DOCUMENTS

GB    0 441 128    8/1991

* cited by examiner

Primary Examiner—Deborah Jones
Assistant Examiner—G. Blackwell-Rudasill
(74) Attorney, Agent, or Firm—Siwen Chen

(57) ABSTRACT

A reflecting mirror comprising a sheet of an alkali metal-zinc-borosilicate glass bonded to a reflecting surface, the glass sheet having a thickness less than 0.5 mm, and being doped with $Nd_2O_3$ in an amount sufficient to substantially reduce the spectral transmission of the glass in the wavelength range of 565–595 nm.

8 Claims, 2 Drawing Sheets

THIN SHEET MIRROR AND $Nd_2O_3$ DOPED GLASS

CROSS REFERENCE TO RELATED APPLICATION

This application claims the benefit of U.S. Provisional Application, Ser. No. 60/255,759, filed Dec. 15, 2000 entitled Thin Sheet Mirror and $Nd_2O_3$ Doped Glass of Ronald L. Stewart.

FIELD OF THE INVENTION

A reflecting mirror comprising a thin sheet of glass, and an alkali metal-zinc-borosilicate glass doped with neodymium oxide (Nd2O3) and adapted to be drawn in the form of a thin sheet.

BACKGROUND OF THE INVENTION

Thin sheet glass, commonly referred to as microsheet, is well known in the glass art. The glass sheets have a thickness less than 0.5 mm, a standard thickness being in the range of 0.3 to 0.4 mm. Microsheet glass is used for such diverse purposes as protective covers for satellite solar cells, laptop LCDs, and glass-plastic laminates.

Mirrors are commonly produced by applying a highly reflecting film or coating of, for example, silver or aluminum, over one flat surface of a glass sheet. Light rays pass through the glass sheet and are reflected back to create the familiar image. Thus, the effective light path in the glass sheet is twice the thickness of the glass sheet.

The present invention is particularly concerned with a rearview mirror such as used in vehicular transport means on sea, on land, or in the air. A problem of long standing is that of visual discomfort, and loss of object definition, created by reflection of certain radiation. The reflection of illumination from a mirror, particularly at night, can be particularly serious. This has led to special mirrors that can be tilted at night. A similar effect occurs with reflected sunlight, especially when the sun is just rising or setting.

It has been reported that this problem largely arises from a relatively narrow portion of the spectral energy distribution in light reflected by a mirror. In terms of color, this is the yellow region which lies primarily between wavelengths of 565 and 595 nm. The red, green and blue regions, which lie outside this wavelength range, appear to provide little or no contribution to the problem.

It is then a primary object of the present invention to provide a reflecting mirror that is improved with respect to the visual discomfort and object blurring that tends to occur with reflected illumination and sunlight.

It is another object to provide a glass that removes, in part at least, the yellow color region in reflected light.

It is a further purpose to provide this selective color effect in glass of microsheet thickness.

It is still another purpose to provide a glass having this desired color absorption effect, in conjunction with viscosity properties that enable the glass to be drawn as microsheet, that is in a thickness less than 0.5 mm.

SUMMARY OF THE INVENTION

The invention resides in part in a reflective mirror comprising a sheet of alkali metal-zinc-borosilicate glass bonded to a reflecting surface, the glass having a thickness less than 0.5 mm and being doped with $Nd_2O_3$ in an amount sufficient to reduce the spectral transmission in the range of 565–595 nm.

The invention further resides in a sheet of an alkali metal-zinc-borosilicate glass containing sufficient $Nd_2O_3$ in its composition to reduce the transmission of 585 nm wavelength to less than 50% in a 0.6 mm path length.

DESCRIPTION OF THE INVENTION

The present invention provides a reflecting mirror, particularly a rearview mirror, in which the visual discomfort and blurring, caused by reflected illumination or sunlight, are alleviated. Such mirrors are widely used in all types of transport vehicles. However, the problem is particularly prevalent in rearview mirrors for automotive vehicles. Accordingly, the invention is described with respect to such application.

Figure 1:
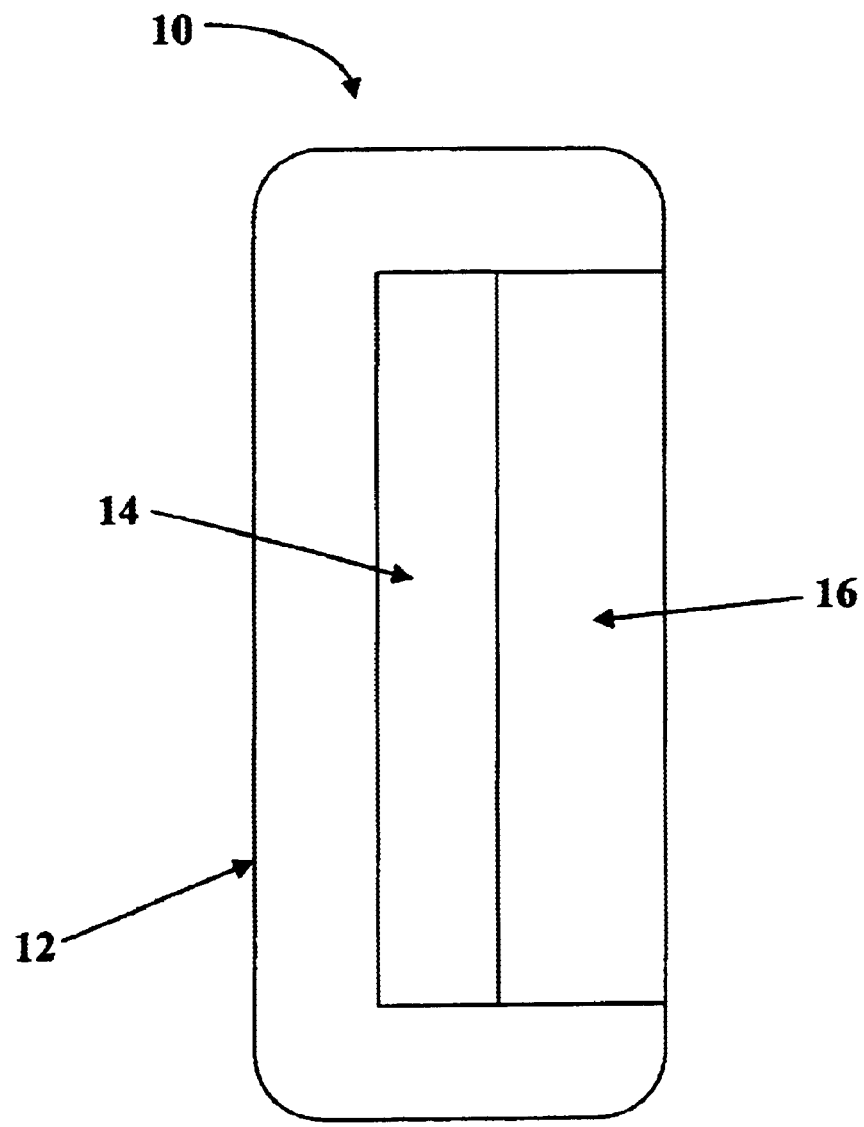
FIG. 1 in the drawing is a side sectional view of a rear view mirror constructed in accordance with the present invention.

FIG. 1 is a side elevational view of a typical rearview mirror embodying the invention, and generally designated 10. Mirror 10 comprises a standard casing or enclosure 12 and a microsheet glass member 16 having a reflecting surface 14, e.g., a silver film on its rear surface. Glass member 16 may be bonded to casing 12 in known manner. On such structure is shown in U.S. Pat. No. 5,566,031.

The present invention is largely concerned with microsheet glass member 16. As pointed out earlier, microsheet glass is less than 0.5 mm in thickness. For present purposes a thickness of about 0.3 mm is employed. Since reflected light traverses glass twice, the effective light path is about 0.6 mm. Accordingly, transmission data shown hereafter was measured on glass samples having a thickness of 0.6 mm.

It has been found that yellow light, that is spectral radiation having a wavelength within the range of 565–595 nm, is the primary cause of the visual discomfort and blurring. It has further been found that doping a glass with up to 20% $Nd_2O_3$ will effectively diminish radiation in this yellow region. Surprisingly, and fortunately, the remaining portions of the visible part of the spectrum have little tendency to cause eye discomfort and blurring.

Any amount of $Nd_2O_3$ doping has some effect, on suppressing the radiation at yellow wavelengths. However, to have a substantial effect, at least about 5% is required. By substantial is meant reduction of the radiation at a wavelength of about 585 nm to a value under 50%.

Conventional sheet glass used in mirrors has a thickness in the range of 0.5–4.0 mm, usually about 2 mm. Such sheet glass may be produced by well known rolling or drawing procedures. Accordingly, it is customary to employ a soda lime silicate glass. This may be modified by other divalent metal oxides for special effects.

The production of thinner microsheet glass requires special processing. For present purposes, a special mechanism, known as a slot draw, is employed. One family of glasses successfully slot drawn into microsheet has an alkali metal-zinc-borosilicate base glass. It has been found that $Nd_2O_3$ does not tend to readily stay dissolved in this base glass. In other words, the glass tends to devitrify with $Nd_2O_3$ crystals separating in the glass.

This prohibitive tendency can, and must, be avoided by carefully choosing the base glass components and the amounts in which they are present. This will become apparent in a subsequent composition TABLE.

In general, it has been found necessary to use lower $B_2O_3$ content while employing a higher range content of alkali metal oxides ($R_2O$) when the $Al_2O_3$ content is over about 2.5%.

At the same time, microsheet drawing imposes some property limitations that must be observed. In general, these involve glass viscosity versus temperature behavior of a glass melt. In particular, the viscosity at the liquidus temperature must be maintained equal to, and preferably above, 20,000 poises. At the same time, the softening temperature of the glass must be maintained in the range of 700–750° C. In the TABLE below, several glass compositions are set forth in weight percent on an oxide basis. These compositions, including comparative examples 7 and 8 which devitrified, illustrate the care that must be taken in compounding a suitable glass composition.

prepared by grinding and polishing molded blanks to a thickness of 0.6 mm, for making measurements of transmission. Regular blanks were obtained for physical property measurements in accordance with conventional procedures.

Figure 2:
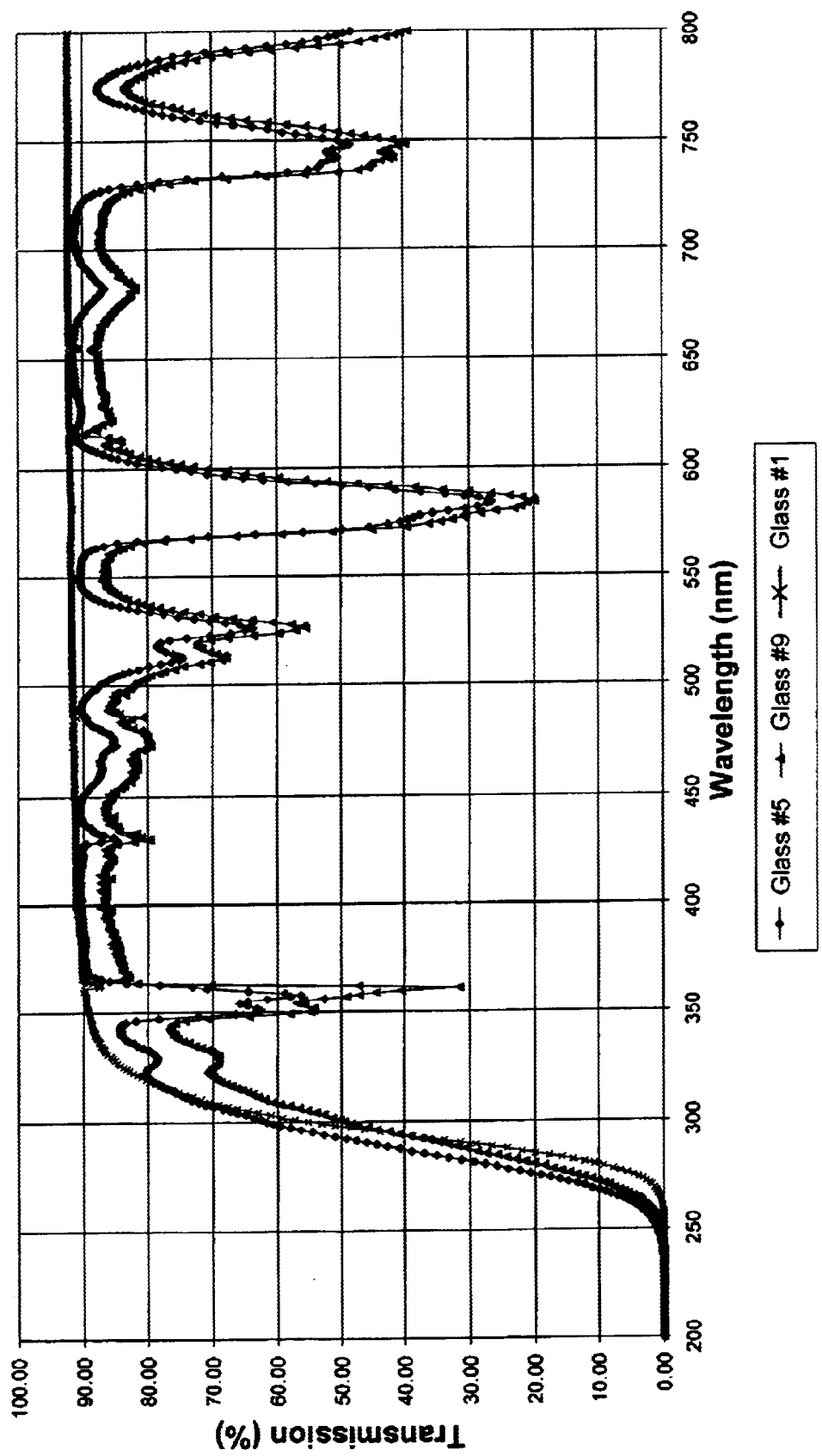
FIG. 2 is a graphical representation illustrating a significant property of $Nd_2O_3$-doped microsheet in accordance with the invention.

FIG. 2 is a graphical representation comparing the optical transmission curves for 0.6 mm thick glass samples having compositions 1, 5 and 9 in the TABLE above. A 0.6 mm sample is used to correspond to the double passage of radiation in a 0.3 mm thick glass mirror.

The significant feature of the transmission curves, for present purposes, is the steep drop in transmission in the yellow portion of the spectrum, that is the portion between 565 and 595 nm. Curve A represents composition 1 which contains no $Nd_2O_3$. This is a typical transmission curve for a non-absorbing, transparent glass containing no colorant or absorbing additive. It shows a steady transmission of slightly over 90% at wavelengths between 380 and 750 nm. In contrast, Curve B is the corresponding transmission curve

| Glass | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Oxide (wt. %) | | | | | | | | | | | | | | | | |
| $SiO_2$ | 65.6 | 64.3 | 62 | 60 | 60 | 60 | 60 | 60 | 63 | 57 | 57 | 58 | 58.5 | 60 | 58 | 55 |
| $Al_2O_3$ | 2.25 | 2.25 | 2.25 | 4.25 | 2.25 | 2.25 | 4.25 | 4.25 | 2.25 | 2 | 2 | 2.25 | 2 | 2 | 2.25 | 6 |
| $Na_2O$ | 7.15 | 7.15 | 7.15 | 7.15 | 5.15 | 5.05 | 4.15 | 6.5 | 6.5 | 7.15 | 6 | 6.5 | 5.4 | 5.4 | 5.2 | 6.2 |
| $B_2O_3$ | 11.1 | 11.1 | 13.4 | 13.4 | 13.4 | 13.5 | 13.4 | 14 | 14 | 11.1 | 11.1 | 13 | 12.85 | 11.1 | 13.4 | 11.65 |
| $K_2O$ | 6.65 | 3.9 | 3.9 | 3.9 | 3.9 | 3.9 | 2.9 | 0 | 0 | 5.5 | 7.65 | 5 | 4 | 4.25 | 4.9 | 4.9 |
| ZnO | 7 | 7 | 7 | 7 | 7 | 5 | 5 | 4 | 4 | 7 | 6 | 7 | 7 | 7 | 7 | 7 |
| $Sb_2O_3$ | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
| $Nd_2O_3$ | 0 | 4 | 4 | 4 | 8 | 8 | 10 | 11 | 10 | 10 | 10 | 8 | 10 | 10 | 9 | 9 |
| Property | | | | | | | | | | | | | | | | |
| Density | | | | | | | | | | | | 2.707 | 2.686 | 2.639 | | |
| CTE ppm | 7.3 | 6.74 | 6.62 | 6.59 | 6.05 | 6.08 | | | 5.27 | 7.69 | 7.81 | 7.43 | | | | |
| Tanneal C | 554 | 556 | 553 | 545 | 555 | 551 | | | 566 | 557 | 559 | 554 | | | | |
| Tstrain C | 514 | 517 | 515 | 508 | 517 | 511 | | | 528 | 518 | 519 | 515 | | | | |
| Tsp C | 748 | 736 | 730 | 715 | 728 | 740 | | | 751 | 716 | 724 | 714 | | | | |
| Liq T (24 hr) C | | | | | | | | | | 960 | 960 | 960 | 1060 | 1060 | 1030 | 1090 |
| Liq Visc kP | | | | | | | | | | 12 | 17 | 14 | | | | |
| Crystal | | | | | | | | | | $Nd_2O_3$ | $Nd_2O_3$ | $Nd_2O_3$ | $Nd_2O_3$ | $Nd_2O_3$ | $Nd_2O_3$ | $Nd_2O_3$ |

| Glass | 17 | 18 | 19 | 20 | 21 | 22 | 23 | 24 |
|---|---|---|---|---|---|---|---|---|
| Oxide (wt. %) | | | | | | | | |
| $SiO_2$ | 55 | 55 | 57 | 57 | 57.8 | 57 | 57 | 58 |
| $Al_2O_3$ | 6 | 6 | 2 | 2 | 2 | 2.5 | 2.5 | 2.5 |
| $Na_2O$ | 4.45 | 6.75 | 7.15 | 7.15 | 7 | 9.25 | 8.25 | 7.75 |
| $B_2O_3$ | 13.4 | 12 | 8 | 8 | 7 | 6 | 6 | 6 |
| $K_2O$ | 5.9 | 4 | 8.6 | 7.6 | 7 | 8 | 8 | 6.5 |
| ZnO | 7 | 6 | 7 | 8 | 9 | 7 | 8 | 9 |
| $Sb_2O_3$ | 0.25 | 0.25 | 0.25 | 0.25 | 0.25 | 0.25 | 0.25 | 0.25 |
| $Nd_2O_3$ | 8 | 10 | 10 | 10 | 10 | 10 | 10 | 10 |
| Property | | | | | | | | |
| Density | | | | | | | | |
| CTE ppm | | | | | | | | |
| Tanneal C | | | | | | | | |
| Tstrain C | | | | | | | | |
| Tsp C | | | | | | | | |
| Liq T (24 hr) C | 1085 | 1115 | 930 | 955 | 905 | 955 | 910 | <670 |
| Liq Visc kP | | | 42 | 23 | 55 | 34 | 65 | >1000 |
| Crystal | $Nd_2O_3$ | $Nd_2O_3$ | $Nd_2O_3$ | $Nd_2O_3$ | $Nd_2O_3$ | $Nd_2O_3$ | $Nd_2O_3$ | none |

Glass batches were prepared from standard ingredients including sand, alumina, zinc oxide, antimony oxide and $Nd_2O_3$. Boric acid and/or sodium borate were used as a source of $B_2O_3$. The alkali metals were added as nitrates or carbonates, or as sodium borate.

The batches were mixed in conventional manner and melted at 1550° C. As noted earlier, glass samples were for the glass sample having composition 5. The transmission of this glass, which contains 8% $Nd_2O_3$, drops steeply in the yellow region to a low value of about 27% at 585 nm. Likewise, Curve C, based on measurements made on a glass having composition 9, shows a somewhat greater drop to a minimum transmission of about 20% at 585 nm.

Comparison glasses, having compositions 7 and 8, devitrified before a 6 mm thick patty cooled from each melt poured on a steel plate. The crystals formed were precipitated $Nd_2O_3$. This indicates that the present glasses tend to be unstable as the amount of $Nd_2O_3$ dopant is increased. The transmission curves of FIG. 2 indicate the desirability of increased $Nd_2O_3$ contents however.

To accommodate larger amounts of $Nd_2O_3$, the base glass must then be adjusted to enhance $Nd_2O_3$ solubility. At the same time, physical property control must be maintained to permit drawing of glass having microsheet thickness. To this end, the liquidus viscosity must be at least 20,000 poises and preferably higher. Also, the softening point of the glass must be maintained at 700 to 750° C.

From the liquidus data thus far obtained that are listed in the Table, it appears that the lower $Al_2O_3$ and $B_2O_3$ levels tend to permit the $Nd_2O_3$ to remain in solution. The glass is stiffened by decreasing the $B_2O_3$ level. This effect can be compensated by concomitant increase of the alkali metal oxides of sodium and potassium along with reducing $Al_2O_3$. The content of ZnO may also be increased somewhat, and with similar the levels of the alkali oxides the glass softening temperature can be further reduced.

In general then, a suitable glass composition will essentially consist, in weight percent on the oxide basis, of:

| | |
|---|---|
| $SiO_2$ | 55–70% |
| $Al_2O_3$ | 0.5–4.5% |
| $B_2O_3$ | 6–14% |
| ZnO | 3–10% |
| $Na_2O$ | 5–11% |
| $K_2O$ | 2–9% |
| $Na_2O + K_2O$ | 7–20% |
| $Nd_2O_3$ | at least 5% |

I claim:

1. A reflecting mirror comprising a sheet of an alkali metal-zinc-borosilciate glass bonded to a reflecting surface, the glass sheet having a thickness less than 0.5 mm, and being doped with $Nd_2O_3$ to substantially reduce the spectral transmission of the glass in the wavelength range of 565–595 nm, wherein the alkali metal-zinc-borosilicate glass consists essentially, by weight percent on an oxide basis, of

| | |
|---|---|
| $SiO_2$ | 55–70% |
| $Al_2O_3$ | 0.5–4.5% |
| $B_2O_3$ | 6–14% |
| ZnO | 3–10% |
| $Na_2O$ | 5–11% |
| $K_2O$ | 2–9% |
| $Na_2O + K_2O$ | 7–20% |
| $Nd_2O_3$ | 5–10%. |

2. A reflecting mirror in accordance with claim 1 wherein the glass sheet has a thickness of 0.3 to 0.4 mm.

3. A reflecting mirror in accordance with claim 1 wherein the transmitted radiation at a wavelength of 585 nm is less than 50%.

4. A reflecting mirror in accordance with claim 3 wherein the transmitted radiation at 585 nm is less than 30%.

5. A reflecting mirror in accordance with claim 1 wherein the reflecting surface is a silver coating on the back of the glass sheet.

6. A thin sheet of alkali metal-zinc-borosilicate glass containing $Nd_2O_3$ to reduce the transmission of radiation at a wavelength of 585 nm to a value less than 50%, wherein the alkali metal-zinc-borosilicate glass consists essentially, by weight percent on an oxide basis, of

| | |
|---|---|
| $SiO_2$ | 55–70% |
| $Al_2O_3$ | 0.5–4.5% |
| $B_2O_3$ | 6–14% |
| ZnO | 3–10% |
| $Na_2O$ | 5–11% |
| $K_2O$ | 2–9% |
| $Na_2O + K_2O$ | 7–20% |
| $Nd_2O_3$ | 5–10%. |

7. A glass sheet in accordance with claim 6 wherein the sheet has a thickness of less than 0.5 mm.

8. A glass sheet in accordance with claim 6 wherein the glass has a liquidus viscosity of at least 20,000 poises and a softening point temperature in the range of 700–750° C.

* * * * *